(12) United States Patent
Starr

(10) Patent No.: US 8,127,193 B2
(45) Date of Patent: Feb. 28, 2012

(54) METHODS AND APPARATUS TO REDUCE ERRORS DURING A RE-TRANSMISSION

(75) Inventor: Thomas Starr, Barrington, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1253 days.

(21) Appl. No.: 11/754,706

(22) Filed: May 29, 2007

(65) Prior Publication Data

US 2008/0301513 A1    Dec. 4, 2008

(51) Int. Cl.
    *H04L 1/18* (2006.01)
(52) U.S. Cl. .................................................. 714/748
(58) Field of Classification Search .......... 714/748–749, 714/18; 375/222; 370/335, 390
    See application file for complete search history.

(56) References Cited

U.S. PATENT DOCUMENTS

| | | | |
|---|---|---|---|
| 4,771,417 A | 9/1988 | Maxwell et al. | |
| 5,805,669 A | 9/1998 | Bingel et al. | |
| 6,404,804 B1 | 6/2002 | Mannering et al. | |
| 6,535,589 B1 | 3/2003 | Nauman et al. | |
| 6,694,470 B1 | 2/2004 | Palm | |
| 6,721,357 B1 * | 4/2004 | Zhang et al. | 375/222 |
| 6,901,547 B2 | 5/2005 | Palm | |
| 7,031,381 B1 | 4/2006 | Betts et al. | |
| 7,051,258 B2 | 5/2006 | Palm | |
| 7,103,817 B1 | 9/2006 | Choksi | |
| 7,600,170 B2 * | 10/2009 | Gaal et al. | 714/748 |
| 2005/0276249 A1 * | 12/2005 | Damnjanovic et al. | 370/335 |
| 2006/0174171 A1 | 8/2006 | Betts et al. | |
| 2007/0230466 A1 * | 10/2007 | Muguruma | 370/390 |

OTHER PUBLICATIONS

Grilo et al., Link adaptation and transmit power control for unicast and multicast in IEEE802.11a/h/e WLANs, 2003, IEEE Computer Society, p. 1 to 12.*
Rollet et al., A 5GHz WLAN MAC performance comparison based on physical layer measurements, 2003, IEEE p. 2594-2598.*
Sun et al., Multiuser detection for packet switched CDMA networks with retransmission diversity, Mar. 2004, IEEE Trans. on Signal Processing vol. 52, No. 3, p. 826-832.*
Biswas et al., Design and implementation of data link control protocol for CBR traffic in wireless ATM networks, 1998, IEEE, p. 833-839.*

* cited by examiner

*Primary Examiner* — Shelly A Chase
(74) *Attorney, Agent, or Firm* — Hanley, Flight & Zimmerman, LLC

(57) ABSTRACT

Methods and apparatus to reduce errors during a re-transmission performed by a communication module are disclosed. An example method includes detecting an error in received data, predicting a time interval that is expected to be substantially error-free, and transmitting a re-transmission request message for the data based on the time interval.

28 Claims, 5 Drawing Sheets

METHODS AND APPARATUS TO REDUCE ERRORS DURING A RE-TRANSMISSION

FIELD OF THE DISCLOSURE

This disclosure relates generally to communication devices and, more particularly, to methods and apparatus to reduce errors during a re-transmission performed by a communication module.

BACKGROUND

Communication systems, devices and/or modules are commonly utilized to provide telephony, video, gaming, computer, data, electronic mail (email), Internet and/or any other communication related services to subscribers, customers, employees, students, etc. Many communication systems, devices, modules and/or protocols implement and/or include one or more mechanisms to detect errors in received data, to detect missing data and/or, in some circumstances, to request the re-transmission of errored and/or missing data. For example, if a sufficient number of errors are detected such that a receiver cannot automatically correct the errors (e.g., by applying error correction decoding techniques), the receiver (e.g., via an associated transmitter) may request re-transmission of the errored data. Errors may be caused by any environmental conditions such as, for example, background noise, electrical spikes, impulse noise, crosstalk noise, thermal noise, equipment failure, temperature changes, radio frequency (RF) interferers, light dimmers, switching-mode power supplies, etc.

DETAILED DESCRIPTION

Methods and apparatus to reduce errors during a re-transmission performed by a communication module are disclosed. A disclosed example method includes detecting an error in received data, predicting a time interval that is expected to be substantially error-free, and transmitting a re-transmission request message for the data based on the time interval. A disclosed example apparatus includes a noise predictor to predict a time interval that is expected to be substantially error-free, and a re-transmission controller to send a re-transmission request message for received data based on the predicted time interval.

Figure 1:
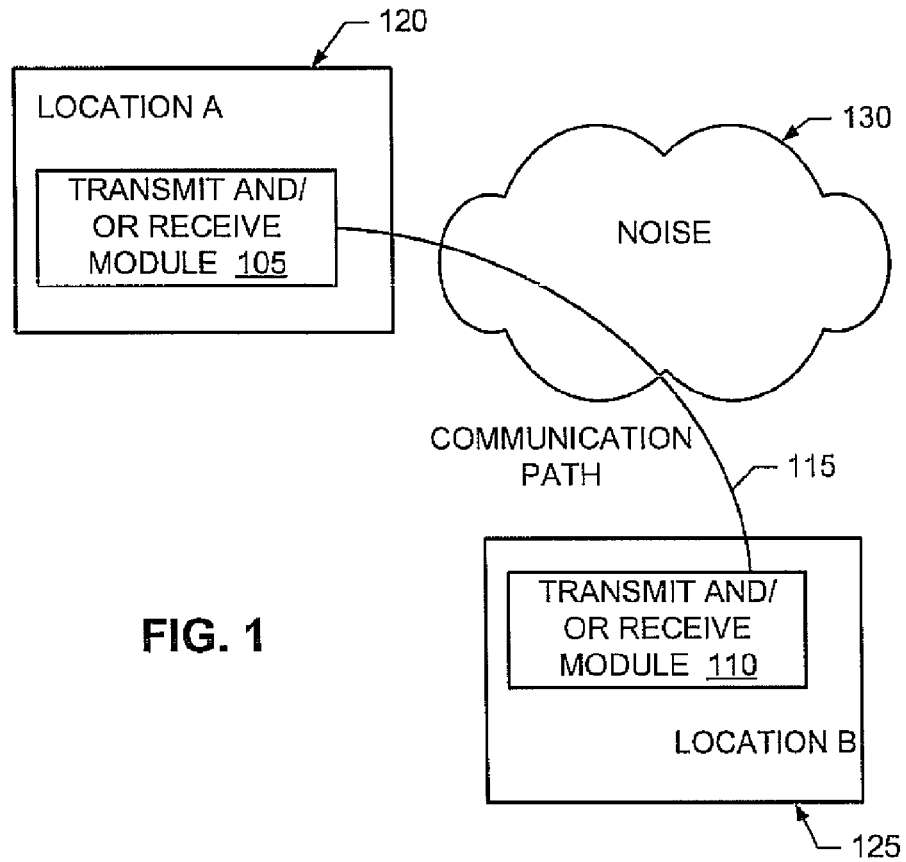
FIG. 1 is a schematic illustration of an example communication system constructed in accordance with the teachings of the invention.

FIG. 1 illustrates an example communication system in which a first transmit and/or receive module 105 communicates with a second transmit and/or receive module 110 via a communication path 115. The example transmit and/or receive modules 105 and 110 may implement and/or include any type(s) of communication device(s), system(s), and/or module(s). For example, the example transmit and/or receive modules 105 and 110 may be implemented in accordance with and/or to interoperate with any past, present and/or future communication device(s), system(s), specification(s) and/or standard(s). Example communication systems, devices, specifications and/or standards include, but are not limited to, public switched telephone network (PSTN) systems, public land mobile network (PLMN) systems (e.g., cellular), wireless distribution systems, wired or cable distribution systems, coaxial cable distribution systems, coaxial cable communication systems (e.g., according to the Data Over Cable Service Interface Specification (DOCSIS)), Ultra High Frequency (UHF)/Very High Frequency (VHF) radio frequency systems, satellite or other extra-terrestrial systems, cellular distribution systems, power-line broadcast systems, fiber optic networks, local area networks (e.g., according to the Institute of Electrical and Electronics Engineers (IEEE) 802.3x family of standards), wireless local area networks (e.g., according to the IEEE 802.11x family of standards), digital subscriber line (DSL) communication systems (e.g., according to the International Telecommunications Union Telecommunications Standardization Sector (ITU-T) G.992x and/or G.993x family of standards), home networking standards (e.g., according to the HomePlug Powerline Alliance, IEEE 802.3x, IEEE 802.11x, etc.), personal area networks (e.g., Bluetooth), point-to-point communication devices (e.g., universal serial bus (USB) and/or IEEE 1394 (a.k.a. Firewire)) and/or any combination and/or hybrid of these devices, systems and/or networks.

The example transmit and/or receive modules 105 and 110 of FIG. 1 may be implemented and/or disposed at any number of locations (e.g., the example locations 120 and 125 of FIG. 1). The example locations 120 and 125 of FIG. 1 may be geographically separate (e.g., different building, different campuses, different cities, different countries, etc.) and/or may be co-located at substantially a same geographic location (e.g., within a building, within a room, etc.).

As described in more detail below in connection with FIGS. 2 and 3, the example transmit and/or receive modules 105 and 110 may be implemented by hardware, software, firmware and/or any combination of hardware, software and/or firmware. Some example transmit and/or receive modules 105 and 110 comprise a modem, a receiver, a transmitter, and/or a transceiver. Other example transmit and/or receive modules 105 and 110 includes a modem, a receiver, a transmitter and/or a transceiver communicatively coupled to a computer and/or other communication device (e.g., a set-top box, a personal digital assistant (PDA), a personal computer (PC), etc.). In such examples, the modem, receiver, transmitter, transceiver, computer and/or communication device may include and/or implement one or more protocol layers (e.g., implemented as machine accessible instructions executed by a processor) on top of (logically) the physical layer functionality implemented by the modem, receiver, transmitter and/or transceiver. Such protocol layers (e.g., the physical layer, a data link layer, a network layer, a transport layer, a session layer, a presentation layer and/or an application layer) are commonly referred to collectively as a protocol stack and may, for example, be implemented in accordance with the open systems interconnect basic reference model (OSI model) for protocol stacks. Thus, the term "transmit and/or receive module" as used herein is to be given its broadest possible interpretation and may, for example, refer to a single communication device (e.g., a modem, a receiver, a transmitter and/or a transceiver), a combination of devices (e.g., a modem coupled to a computer), and/or a combination of one or more devices and one or more protocol stacks.

The example communication path 115 of FIG. 1 may be any type of communication path, such as, for example, a wired communication path (e.g., power-line, twisted pair telephone cabling, and/or co-axial cabling), a wireless communication path (e.g., cellular, WLAN, and/or Bluetooth), a satellite communication path and/or a terrestrial communication path. Moreover, the example communication path 115 may include more than one segment and/or transmission path. For example, a communication path 115 may include a DSL communication path as well as a WLAN communication path. Regardless of the number, type(s), and/or topology of communication paths used to construct the example communication path 115 of FIG. 1, it will be referred to herein in the singular form but it will be understood that it may refer to one or more communication paths and/or to paths having one or more segments.

As illustrated in FIG. 1, the example communication path 115 (and/or any communication path(s) used to form the communication path 115) is subjected to one or more environmental conditions 130 that affect all or any portion(s) of the communication path 115. The example environmental conditions 130 of FIG. 1 may affect the data rate(s) supportable via the communication path 115 and/or the rate and/or frequency at which errors occur on the communication path 115. Example environmental conditions 130 include, but are not limited to, background noise, electrical spikes, impulsive noise, crosstalk noise, thermal noise, equipment failure, temperature changes, one or more radio frequency (RF) interferers, light dimmers, switching-mode power supplies, etc. While some errors in received data can be automatically corrected (e.g., by applying an error correction decoding technique), some errors are not automatically correctable by a transmit and/or receive module 105, 110. In such instances, the transmit and/or receive module 105, 110 may request re-transmission of the errored data. For example, to request re-transmission, the transmit and/or receive module 105, 110 sends a re-transmission request message to the sender of the data (e.g., another transmit and/or receive module 105, 110).

Some of the example environmental conditions 130 of FIG. 1 (e.g., caused by noise events due to light dimmers and/or switching power supplies) cause errors at and/or during substantially periodic and/or predictable times, instants, and/or time intervals. Moreover, such noise events 130 may cause significant numbers of errors and, thus, trigger a transmit and/or receive module 105, 110 to repeatedly request re-transmission of the errored data. To reduce the likelihood that the re-transmission of the errored data be errored by yet another noise event 130, the example transmit and/or receive module 105, 110 predicts a time interval that is expected to be substantially error-free (e.g., to not contain a predicted noise event 130). As described in detail below in connection with FIGS. 4 and 5, the example transmit and/or receive module 105, 110 uses past and/or present occurrences of noise and/or error events, to predict a substantially error-free time interval for re-transmission of the error data. As used herein, a substantially error-free time interval is a time occurring between two noise and/or error events (actual and/or predicted). Example substantially error-free time intervals include a time interval defined b (e.g., located between) the current time and the next predicted noise and/or error event, and/or a time interval defined by the next two predicted noise and/or error events. The transmit and/or receive module 105, 110 of the illustrated example requests the re-transmission of the errored data such that the re-transmission occurs during a predicted, substantially error-free time interval. In some examples, the transmit and/or receive module 105, 110 sends the re-transmission request and receives the re-transmitted data during the same predicted error-free time interval (e.g., if there is enough time prior to the next predicted noise and/or error event). In other examples, the transmit and/or receive module 105, 110 sends the re-transmission request message during a first predicted error-free time interval that precedes the next predicted noise and/or error event, and indicates to the sender to re-transmit the data during a second predicted error-free time interval that follows the next predicted noise and/or error event. Such an approach may be employed, for instance, if there is enough time to transmit the re-transmission request message before the next predicted noise and/or error event, but not enough time to also re-transmit the data. In still other examples, the transmit and/or receive module 105, 110 uses one or the other of these example methods depending upon the amount of time remaining till the next predicted error-free time interval. In other examples, the transmit and/or receive module 105, 110 waits until the next predicted noise and/or error event and then requests re-transmission before or after a next predicted noise and/or error event.

The use of past and/or present error and/or noise events to predict substantially error-free time intervals and/or to use a predicted error-free time interval for the re-transmission of errored data may be implemented and/or performed by one or more portions of a transmit and/or receive module 105, 110. For example, a modem and/or transceiver used to physically convey data across the communication path 115 may predict error-free time intervals and use the same for the re-transmission of data. Additionally or alternatively, one or more protocol stack layer(s) implemented (logically) on top of the modem and/or transceiver may predict error-free time intervals and use the same for the re-transmission of data. Thus, the prediction and use of error-free time intervals may occur at one or more places within a transmit and/or receive module 105, 110 (e.g., simultaneously within one or more layers of a protocol stack).

In contrast, traditional methods of re-transmitting data include sending the re-transmission request message when or shortly after the error occurs, and having the data sender re-transmit the data as soon as the re-transmission request message is received without any attempt to predict further noise events. Such traditional methods may perform poorly in the presence of substantially periodic and/or substantially predictable noise events. For example, the re-transmission request messages and/or the re-transmission of the data are often subject to further errors which necessitate still additional re-transmission request messages and/or data re-transmissions. Therefore, the methods, apparatus and techniques described herein substantially reduce the occurrence of errors during the re-transmission of data by predicting error-free time intervals and then coordinating the re-transmission of the data with the predicted error-free time intervals.

Figure 2:
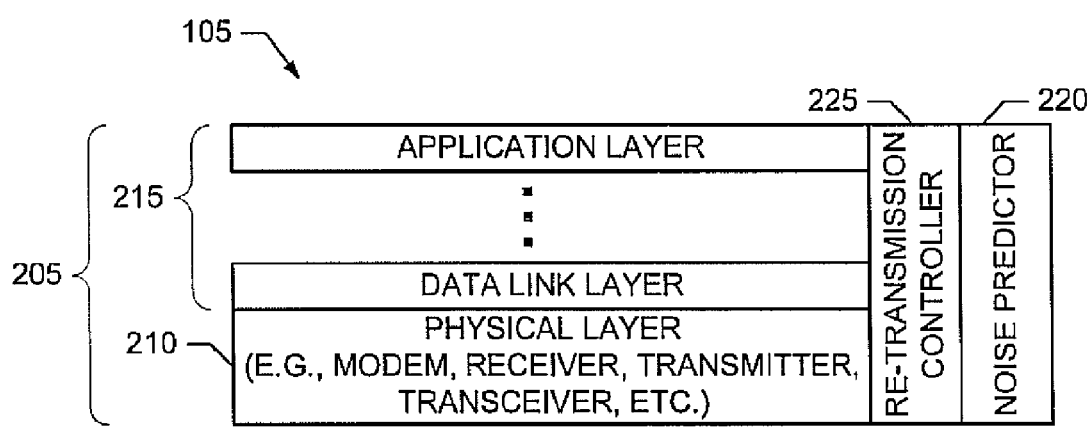
FIGS. 2 and 3 illustrate example manners of implementing any or all of the example transmit and/or receive modules of FIG. 1.
Figure 3:
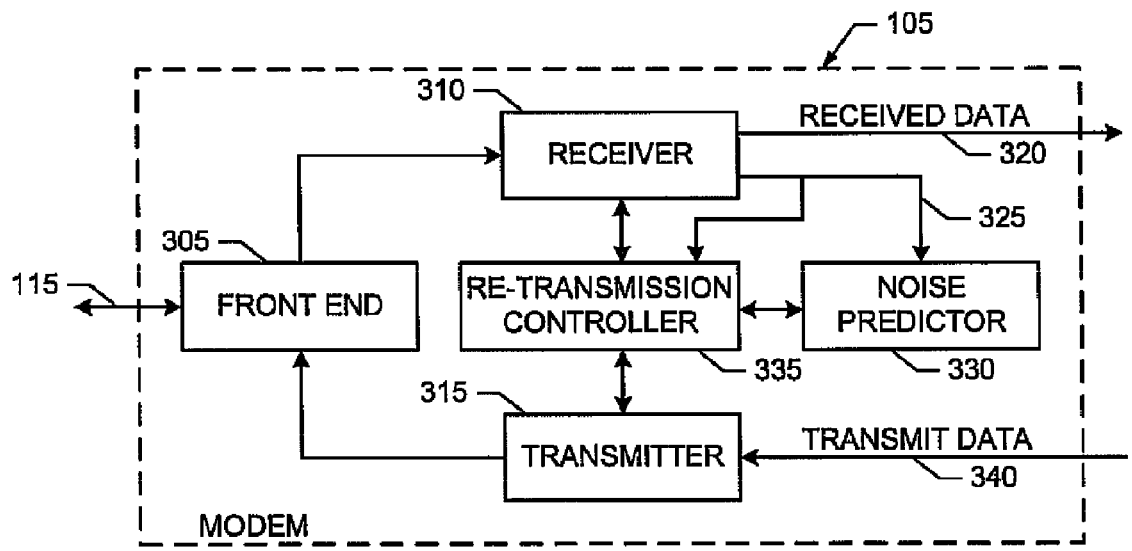

FIGS. 2 and 3 illustrate example manners of implementing any or all of the example transmit and/or receive modules 105 and 110 of FIG. 1. While any or all of the example transmit and/or receive modules 105 and 110 of FIG. 1 may be represented by FIG. 2, for ease of discussion, the device of FIG. 2 will be referred to as transmit and/or receive module 105. The example transmit and/or receive module 105 of FIG. 2 is implemented using a protocol stack 205 that includes a physical layer device 210 (e.g., a modem, a receiver, a transmitter and/or a transceiver) and one or more protocol layers 215 executed on top of the physical layer 210. As described above in connection with FIG. 1, the example physical layer device 210 of FIG. 2 may be any type of physical layer device (e.g., a DSL modem, an Ethernet transceiver and/or a WLAN transceiver).

To predict substantially error-free time intervals, the example protocol stack 205 of FIG. 2 includes one or more noise predictors 220 to be implemented by and/or within one or more of the layers of the protocol stack 205 (e.g., within the physical layer 210 as described below in connection with FIG. 3). The example noise predictor 220 of FIG. 2 uses one or more past and/or present noise events and/or errors to predict when a next noise and/or error event is likely to occur. The time at which future noise and/or error events are predicted to occur can be used to predict substantially error-free time intervals. An example manner of implementing any or all the example noise predictors 220 of FIG. 2 is described below in connection with FIG. 4. Example machine accessible instructions that may be executed to implement any or all of the example noise predictors 220 of FIG. 2 are described below in connection with FIG. 6.

To control the re-transmission of data received by the example transmit and/or receive module 105 of FIG. 2, the example protocol stack 205 includes one or more re-transmission controllers 225 to be implemented by and/or within one or more of the layers of the protocol stack 205 (e.g., within the physical layer 210 as described below in connection with FIG. 3). When uncorrectable errors (e.g., triggering a need for data re-transmission) and/or a noise event are detected (e.g., by a receiver of the physical layer 210 and/or an element of the protocol layers 215), the example re-transmission controller 225 of FIG. 2 consults with the noise predictor 220 to determine one or more time intervals that are expected to be substantially error-free. The re-transmission controller 225 then sends a re-transmission request message during a predicted error-free time interval. In some examples, the re-transmission controller 225 sends the re-transmission request and receives the re-transmitted data during the same predicted error-free time interval. The predicted error-free time interval may occur before or after the next predicted noise and/or error event depending upon the time until the next predicted noise and/or error event. In other examples, the re-transmission controller 225 sends the re-transmission request message during a first predicted error-free time interval, and indicates to the sender in the re-transmission request message to re-transmit the data during a second (later in time) predicted error-free time. In still other examples, the re-transmission controller 225 selects one or the other of these example methods depending upon the amount of time remaining till the next predicted error-free time interval. Example machine accessible instructions that may be executed to implement any or all of the example re-transmission controllers 225 of FIG. 2 are described below in connection with FIG. 7.

FIG. 3 illustrates another example manner of implementing any or all of the example transmit and/or receive modules 105 and 110 of FIG. 1 and/or the example physical layer 210 of FIG. 2. While any or all of the example transmit and/or receive modules 105 and 110 of FIG. 1 and/or the example physical layer 210 of FIG. 2 may be represented by FIG. 3, for ease of discussion, in the example of FIG. 3 the device will be referred to as modem 105.

To support communications via the example communication path 115, the example modem 105 of FIG. 3 includes any front ends (one of which is designated in FIG. 3 with reference numeral 305), any receivers (one of which is designated in FIG. 3 with reference numeral 310) and any transmitters (one of which is designated in FIG. 3 with reference numeral 315). The example front end 305 includes circuits, modules, devices and/or components (e.g., filters, digital-to-analog converters, RF modulators, amplifiers and/or antennas) to transmit signals generated by the example transmitter 315 onto and/or into the communication path 115. The example front end 305 likewise includes circuits, modules, devices and/or components (e.g., filters, analog-to-digital converters, RF demodulators, amplifiers and/or antennas) to process signals received via and/or on the communication path 115 into a form suitable for processing by the example receiver 310.

Using any methods, logic, technique(s) and/or algorithm(s), the example receiver 310 processes signals received from the front end 305 to extract user, control and/or management data 320. For example, the receiver 310 performs equalization, constellation decoding, error detection and/or correction and/or de-framing in accordance with any past, present and/or future standard and/or specification (e.g. the ITU-T G.992x and/or the G.993x family of standards). As illustrated in FIG. 3, the example receiver 310 provides information 325 regarding noise events and/or data reception errors to a noise predictor 330 and/or a re-transmission controller 335 for use in predicting substantially error-free time intervals and/or to trigger the transmission of re-transmission request messages. Example noise event and/or error information 325 includes, but is not limited to, the time when a noise event and/or error was detected and/or occurred, a frame and/or symbol number of an affected frame and/or symbol, the duration of the noise event, the number of errors, the number of errored received symbols, the number of errored received frames, etc. An example graph illustrating example noise event and/or error information 325 is described below in connection with FIG. 5.

Using any methods, logic, technique(s) and/or algorithm(s), the example transmitter 315 processes user, control and/or management data 340 to form signals suitable for transmission by the front end 305. For example, transmitter 315 performs buffering, framing, error correction encoding and/or constellation encoding in accordance with any past, present and/or future standard and/or specification (e.g. the ITU-T G.992x and/or the G.993x family of standards). As directed by the example re-transmission controller 335, the example transmitter 315 of FIG. 3 may also generate, form and/or send re-transmission request messages.

In the illustrated example of FIG. 3, the data is transmitted and/or received using frames and/or packets having lengths that correspond and/or are based on (e.g., are an integer sub-multiple or multiple of) the transmission symbol and/or frame size used by the transmitter 315 to transmit data and/or the receiver 310 to receive data. A transmission symbol used by the transmitter 315 may correspond to, for example, a discrete multitone (DMT) symbol used by an asymmetric DSL (ADSL) and/or a very high speed DSL (VDSL) modem to modulate and/or demodulate data. In some examples, data is transmitted using frames that are the same size (in terms of bits transported) as the size of a DMT symbol boundary. In such examples, noise and/or error events may be detected by detecting DMT symbols having one or more unrecoverable errors. Because many noise and/or error events are short in duration they most often only affect one transmission symbol and/or frame. Thus, by coupling the length of data frames and/or packets to the length of transmission symbols and/or frames, the example modem 105 of FIG. 3 reduces the need for data retransmissions and, further, can reduce the likelihood that any re-transmissions are corrupted by noise events. For example, if a re-transmission request message and/or the re-transmitted data are split across two transmission symbols and/or frames, the likelihood that one or both of the request message and/or re-transmitted data are affected by noise is increased.

To predict substantially error-free time intervals, the example modem 105 of FIG. 3 includes the example noise predictor 330. The example noise predictor 330 of FIG. 3 uses one or more past and/or present noise events and/or errors (e.g., received via the noise event and/or error information 325) to predict when one or more next noise and/or error events are likely to occur. The time(s) at which the next error and/or next noise event(s) are predicted to occur can be used to predict one or more substantially error-free time intervals for transmission of a re-transmission request message and to re-transmit the data. An example manner of implementing the example noise predictor 330 of FIG. 3 is described below in connection with FIG. 4. Example machine accessible instructions that may be executed to implement the example noise predictors 330 are described below in connection with FIG. 6.

To control the re-transmission of data received by the example modem 105 of FIG. 3, the example modem 105 includes a re-transmission controller 335. When uncorrectable errors (e.g., errors triggering a need for data re-transmission) and/or a noise event are detected (e.g., by the example receiver 310), the example re-transmission controller 335 of FIG. 3 consults with the noise predictor 330 to determine one or more time intervals that are expected to be substantially error-free. Based on the predicted error-free time interval(s), the re-transmission controller 335 sends a re-transmission request message. In some examples, the re-transmission controller 335 sends the re-transmission request and receives the re-transmitted data during the same predicted error-free time interval. In other examples, the re-transmission controller 335 sends the re-transmission request message during a first time interval, and indicates to the sender in the re-transmission request message to re-transmit the data during a second time interval. Example machine accessible instructions that may be executed to implement the example re-transmission controller 335 of FIG. 3 are described below in connection with FIG. 7.

While example manners of implementing any or all of the example transmit and/or receive modules 105 and 110 of FIG. 1 have been illustrated in FIGS. 2 and 3, one or more of the elements, processes and/or devices illustrated in FIGS. 2 and/or 3 may be combined, divided, re-arranged, omitted, eliminated and/or implemented in any other way. Further, the example physical layer 210, the example protocol layers 215, the example protocol stack 205, the example noise predictor 220, the example re-transmission controller 225, the example front end 305, the example receiver 310, the example transmitter 315, the example noise predictor 330, the example re-transmission controller and/or, more generally, the example transmit and/or receive modules 105 may be implemented by hardware, software, firmware and/or any combination of hardware, software and/or firmware. Further still, example transmit and/or receive modules 105 may include one or more elements, processes and/or devices in addition to, or instead of, those illustrated in FIGS. 2 and/or 3, and/or may include more than one of any or all of the illustrated elements, processes and devices.

Figure 4:
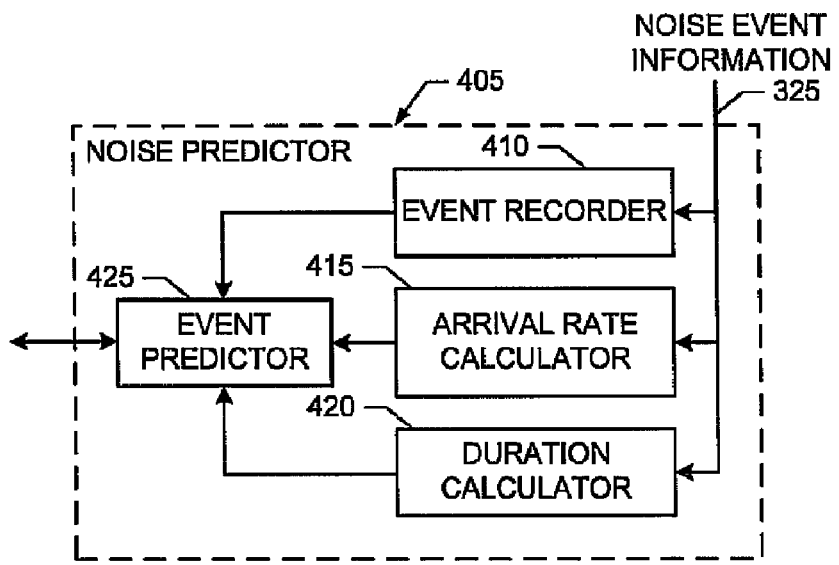
FIG. 4 illustrates an example manner of implementing the example noise predictor of FIG. 3.

FIG. 4 illustrates an example manner of implementing any or all of the example noise predictors 220 and 330 of FIGS. 2 and/or 3. While any or all of the example noise predictors 220 and 330 may be represented by FIG. 4, for ease of discussion, the example device of FIG. 4 will be referred to as a noise predictor 405. To store information regarding past and/or present noise and/or error events, the example noise predictor 405 of FIG. 4 includes an event recorder 410. The example event recorder 410 of FIG. 4 stores and/or records a first value representative of when a noise and/or error event occurred (e.g., a time, a frame and/or a symbol number) and a second value representative of the duration of the noise event and/or error (e.g., a number of milliseconds, a number of frames and/or a number of symbols affected). However, the durations of noise and/or error events need not be recorded and/or stored, for example, when substantially error-free time intervals are only predicted using arrival and/or occurrence information.

Figure 5:
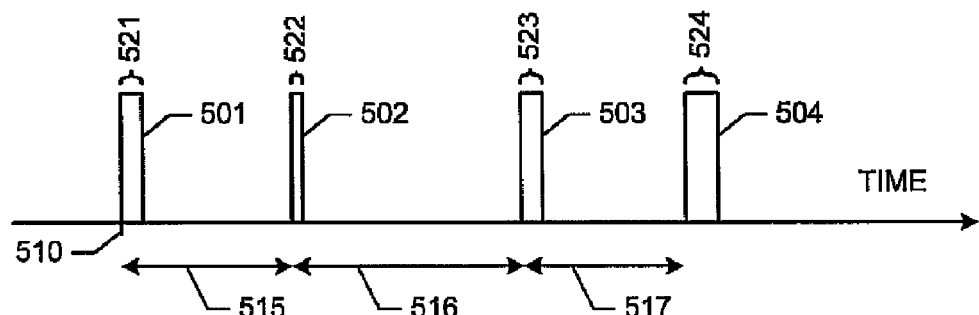
FIG. 5 illustrates an example sequence of noise events.

To determine the mean arrival rate of noise and/or error events, the example noise predictor 405 of FIG. 4 includes an arrival rate calculator 415. The example arrival rate calculator 415 of FIG. 4 uses the arrival times of one or more past and/or present noise and/or error events to calculate the mean and/or average rate at which noise and/or error events are occurring and/or have historically occurred. The example graph of FIG. 5 illustrates a string of noise and/or error events 501, 502, 503 and 504. Each of the example events 501-504 of FIG. 5 has an associated time of occurrence. For example, the example event 501 occurred at a time 510. Based upon the time at which the events 501-504 occurred, differences 515, 516 and 517 can be calculated that represent the time that elapsed (e.g., in milliseconds, symbols and/or frames) between each pair of events 501-504. For example, the example difference 515 represents elapsed time between the occurrence of the events 501 and 502. The example difference 516 represents elapsed time between the occurrence of the events 502 and 503. The example difference 517 represents elapsed time between the occurrence of the events 503 and 504. The example arrival rate calculator 415 of FIG. 4 calculates a mean and/or average arrival rate of noise and/or error events (e.g., the example events 501-504) by computing a mean and/or average of the differences 515-517. In particular, as each new noise and/or error event occurs, the example arrival rate calculator 415 computes a new difference and updates the mean and/or average arrival rate based on the new difference. In some examples, the arrival rate calculator 415 uses the new difference to update an exponential moving average of the arrival rate. In other examples, the arrival rate calculator 415 uses a set (e.g., defined by a sliding window) of differences (e.g., the differences 515-517) to determine a mean arrival rate. The arrival rate calculator 415 may, additionally or alternatively, calculate one or more statistical values that represent the predictability of noise and/or error events. For example, a standard deviation of the differences 515-517 may be computed. If the standard deviation is, for example, greater than a threshold, the example noise predictor 405 may determine that noise and/or error events cannot be reliably be predicted. Additionally or alternatively, the arrival rate calculator 415 and/or, more generally, the example noise predictor 405 uses a type of a noise and/or error event to select a method to predict noise and/or error events. For example, the arrival rate calculator 415 and/or, more generally, the example noise predictor 405 may detect the presence of impulse noise and/or repeating noise (e.g., caused by light dimmers and/or switching-mode power supplies) to activate and/or enable the prediction of noise and/or error events. Other types of noise may also be predictable, however, with different characteristics and, thus, other method(s) of predicting future noise and/or error events may be selected. For example, crosstalk noise that changes with time-of-day (e.g., worsens in the evening and/or on weekends) may be used to adjust one or more parameters of the modem and/or while predicting future noise and/or error events.

Returning to FIG. 4, to determine the expected duration of noise and/or error events, the example noise predictor 405 of FIG. 4 includes a duration calculator 420. The example duration calculator 420 of FIG. 4 uses the durations of one or more past and/or present noise and/or error events to calculate the mean and/or average duration of noise and/or error events. For example, each of the example noise events 501-504 of FIG. 5 has an associated duration 521, 522, 523 and 524. The example duration calculator 420 can calculate a mean and/or average duration by computing a mean and/or average of the durations 521-524. In particular, as each new noise and/or error event occurs, the example duration calculator 420 updates the mean and/or average duration based on the duration of the new event (e.g., the duration 524). In some examples, the duration calculator uses the new duration to update an exponential moving average duration. In other examples, the duration calculator 420 uses a set (e.g., defined by a sliding window) of durations (e.g., the durations 521-524) to determine a mean duration. The duration calculator 420 may, additionally or alternatively, calculate one or more statistical values that represent the predictability of noise and/or error event durations. For example, a standard deviation of the durations 521-524 may be computed. If the standard deviation is, for example, greater than a threshold, the example noise predictor 405 may determine that noise and/or error events and/or event durations cannot be reliably predicted.

To predict when a noise and/or error event will likely occur, the example noise predictor 405 of FIG. 4 includes an event predictor 425. The example event predictor 425 of FIG. 4 uses the occurrence time of the most recent noise and/or error event and the mean and/or average arrival rate to predict the most likely time that the next noise and/or error event will occur. The example event predictor 425 of FIG. 4 may predict the next noise and/or error event by computing a sum of the most recent occurrence time and the mean and/or average arrival rate. Based upon the current time and the time at which the next predicted noise and/or error event is likely to occur, the event predictor 425 determines one or more time intervals in which the re-transmission is to occur. For example, when the current time is too close to the next noise and/or error event to transmit either the re-transmission message or to re-transmit the data, the example event predictor 425 defines one or more one or more time intervals that follow the next predicted noise and/or error event in which to re-transmit the data. When there is enough time to transmit the re-transmission request message, but not enough time to re-transmit the data, the example event predictor 425 may define a first time interval preceding the next predicted noise and/or error event and a second time interval following the next predicted noise and/or error event in which to re-transmit the data. When there is enough time to transmit both the re-transmission request message and to re-transmit the data, the event predictor 425 may define a time interval preceding the next predicted noise and/or error event in which to re-transmit the data. When the mean and/or average duration of noise and/or error events are computed, the example event predictor 425 may select the time interval(s) to exclude the most likely duration of noise and/or error events. Moreover, when the arrival rate calculator 415 and/or the duration calculator 420 determine statistical values that represent whether noise and/or error events can be reliably predicted, the event predictor 425 only predicts noise and/or error events and/or selects time intervals for re-transmissions when noise and/or error events are predictable.

When noise and/or error events are not predictable, then the example re-transmission controllers described herein (e.g., any or all of the example re-transmission controllers 225 and/or 335) request data re-transmission using traditional methods.

While an example manner of implementing any or all of the example noise predictors 220 and 330 of FIGS. 2 and 3 has been illustrated in FIG. 4, one or more of the elements, processes and/or devices illustrated in FIG. 4 may be combined, divided, re-arranged, omitted, eliminated and/or implemented in any other way. Further, the example event recorder 410, the example arrival rate calculator 415, the example duration calculator 420, the example event predictor and/or, more generally, the example noise predictor 405 may be implemented by hardware, software, firmware and/or any combination of hardware, software and/or firmware. Further still, example noise predictor 405 may include one or more elements, processes and/or devices in addition to, or instead of, those illustrated in FIG. 4, and/or may include more than one of any or all of the illustrated elements, processes and devices.

Figure 6:
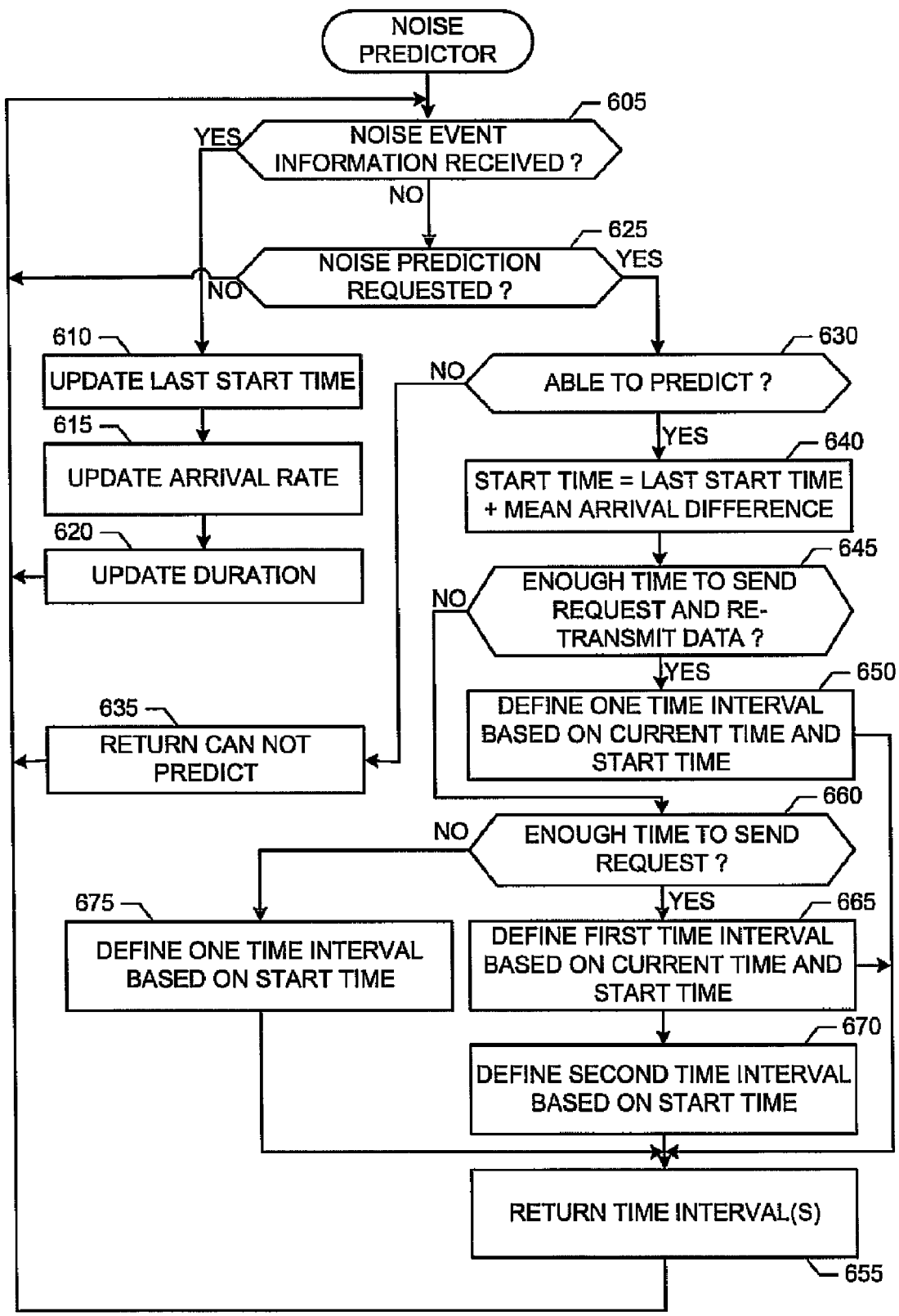
FIG. 6 is a flowchart representative of example machine accessible instructions which may be executed to implement any or all of the example noise predictors of FIGS. 2-4.
Figure 7:
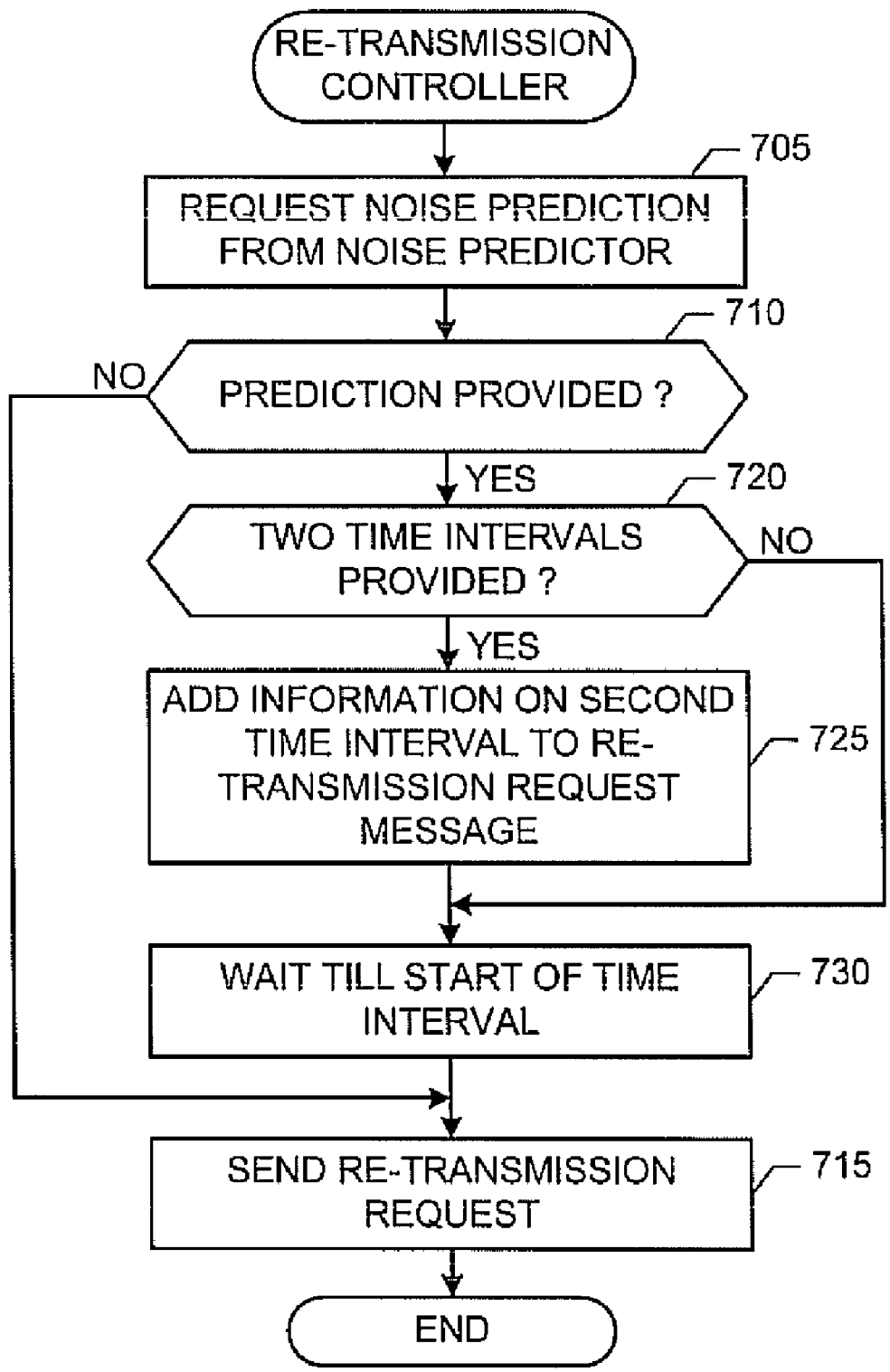
FIG. 7 is a flowchart representative of example machine accessible instructions which may be executed to implement any or all of the example re-transmission controllers of FIGS. 2 and/or 3

FIG. 6 is a flowchart representative of example machine accessible instructions which may be executed to implement any or all of the example noise predictors 220, 330 and/or 440 of FIGS. 2-4. FIG. 7 is a flowchart representative of example machine accessible instructions which may be executed to implement any or all of the example re-transmission controllers 225 and/or 335 of FIGS. 2 and/or 3. The example machine accessible instructions of FIGS. 6 and/or 7 may be carried out by a processor, a controller and/or any other suitable processing device. For example, the example machine accessible instructions of FIGS. 6 and/or 7 may be embodied in coded instructions stored on a tangible medium such as a flash memory, a ROM and/or RAM associated with a processor (e.g., the example processor 805 discussed below in connection with FIG. 8). Alternatively, some or all of the example machine accessible instructions of FIGS. 6 and/or 7 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example machine accessible instructions of FIGS. 6 and/or 7 may be implemented manually or as any combination of any of the foregoing techniques, for example, any combination of firmware, software, discrete logic and/or hardware. Further, although the example machine accessible instructions of FIGS. 6 and 7 are described with reference to the flowcharts of FIGS. 6 and 7, persons of ordinary skill in the art will readily appreciate that many other methods of implementing the machine accessible instructions of FIGS. 6 and/or 7 may be employed. For example, the order of execution of the blocks may be changed, and/or one or more of the blocks described may be changed, eliminated, sub-divided, or combined. Additionally, persons of ordinary skill in the art will appreciate that any or all of the example machine accessible instructions of FIGS. 6 and/or 7 may be carried out sequentially and/or carried out in parallel by, for example, separate processing threads, processors, devices, discrete logic, circuits, etc.

The example machine accessible instructions of FIG. 6 begin with a noise predictor (e.g., any or all of the example noise predictors 220, 330 and/or 405 of FIGS. 2-4) checking whether noise and/or error event information was received (block 605). If noise and/or error information was received (block 605), the noise predictor (e.g., the example event recorder 410) records the start time of the noise and/or error event (block 610). The noise predictor (e.g., the example arrival rate calculator 415) updates the mean and/or average arrival rate (block 615). When the width of the noise and/or error event is detected, the noise predictor (e.g., the example duration calculator 420) then updates the mean and/or average duration (block 620). Control then returns to block 605 to check for more noise and/or error event information.

If noise and/or error event information was not received (block 605), the noise predictor determines if a noise prediction request was received (e.g., from any of the example re-transmission controllers 225 and/or 335 of FIGS. 2 and/or 3) (block 610). If a prediction request was not received (block 625), control returns to block 605 to check for noise and/or error event information. If a noise prediction request was received (block 630), the noise predictor (e.g., the example event predictor 425) determines if the next noise and/or error event can be reasonably predicted by, for example, comparing a standard deviation computed by the arrival rate calculator and/or the duration calculator with a threshold (block 630). If the next noise and/or error event cannot be reasonably predicted (block 630), the noise predictor returns an indication to the re-transmission controller that the next noise and/or error event cannot be predicted (block 635). Control then returns to block 605 to check for noise and/or error event information.

Returning to block 630, if the event predictor is able to reasonably predict the next noise and/or error event (block 630), the event predictor estimates the time at which the next noise and/or error event will occur (block 640). In the example of FIG. 6, if there is enough time before the next predicted noise and/or error event to both transmit the re-transmission request and to re-transmit the data (block 645), the event predictor defines one time interval that is expected to be error free based on the current time and the time of the next predicted noise and/or error event (block 650). The event predictor returns the defined time interval (block 655). Control then returns to block 605 to check for noise and/or error event information.

Returning to block 645, if there is not enough time before the next predicted noise and/or error event to both transmit the re-transmission request and to re-transmit the data (block 645), in the example of FIG. 6, the event predictor determines if there enough time before the next predicted noise and/or error event to transmit the re-transmission request (block 660). If there enough time before the next predicted noise and/or error event to transmit the re-transmission request (block 660), the event predictor defines a first time interval that is expected to be error free based on the current time and the time of the next predicted noise and/or error event (block 665) and a second time interval that is expected to be error free and that follows the next predicted noise and/or error event (block 670). The event predictor returns the defined time intervals (block 655). Control then returns to block 605 to check for noise and/or error event information.

Returning to block 660, if there is not enough time before the next predicted noise and/or error event to transmit the re-transmission request (block 660), the event predictor defines a time interval that is expected to be error free and that follows the next predicted noise and/or error event (block 675). The event predictor returns the defined time interval (block 655). Control then returns to block 605 to check for noise and/or error event information.

The example machine accessible instructions begin with a re-transmission controller (e.g., any of the example re-transmission controllers 225 and/or 335 of FIGS. 2-3) receiving a notification that a noise and/or error event occurred that requires re-transmission of received data. The re-transmission controller request a noise prediction from a noise predictor (e.g., any of the example noise predictors 220, 330 and/or 440 of FIGS. 2-4) (block 705). If no noise prediction was provided by the noise predictor (e.g., because it is presently not possible to predict a next noise and/or error event with sufficient accuracy) (block 710), the re-transmission controller sends a re-transmission request message (block 715). Control then exits from the example machine accessible instructions of FIG. 7.

If a noise prediction was provided by the noise predictor (block 710), the re-transmission controller determines if more than one substantially error-free time intervals was defined by the noise predictor (block 720). If more than one substantially error-free time intervals was defined by the noise predictor (block 720), the re-transmission controller adds information to the re-transmission request message specifying that the data is to be re-transmitted during the second error-free time interval (block 725). If only one substantially error-free time interval was returned by the noise predictor (block 720), control proceeds to block 730 without adding information to the re-transmission request message. The re-transmission controller waits until at least the start of the first error-free time interval returned by the noise predictor (block 730). In some instances, the re-transmission controller will not need to wait because the error-free time interval corresponds to a current time and, thus, has already started. The re-transmission controller then sends a re-transmission request message (block 715). Control then exits from the example machine accessible instructions of FIG. 7.

Figure 8:
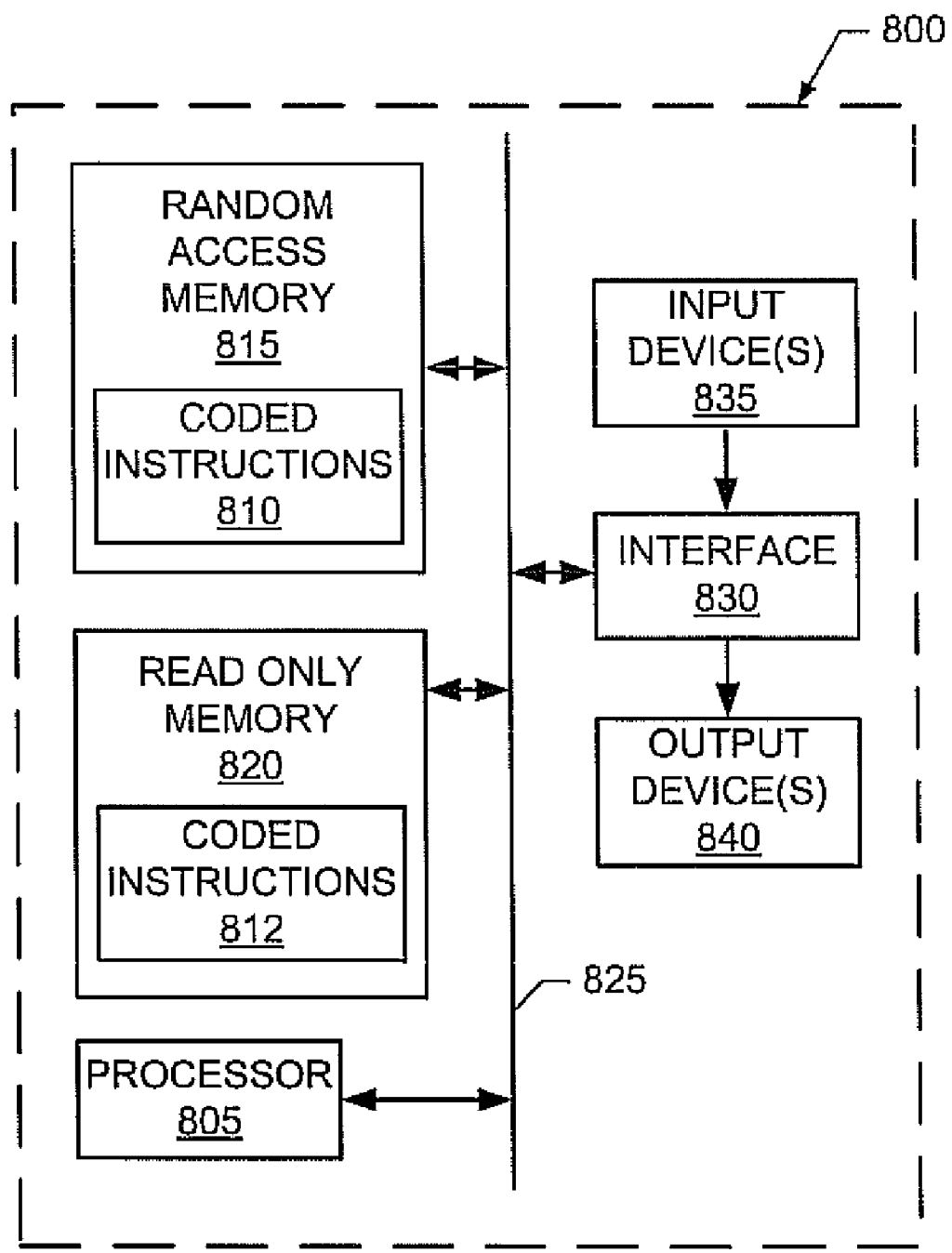
FIG. 8 is a schematic illustration of an example processor platform that may be used and/or programmed to execute the example machine accessible instructions of FIGS. 6 and/or 7 to implement any or all of the example noise predictors, any or all of the example re-transmission controllers and/or, more generally, any or all of the example transmit and/or receive modules described herein.

FIG. 8 is a schematic diagram of an example processor platform 800 that may be used and/or programmed to implement any portion(s) and/or all of the example transmit and/or receive modules described herein. For example, the processor platform 800 can be implemented by one or more processors, processor cores, microcontrollers, DSPs, DSP cores, ARM processors, ARM cores, etc.

The processor platform 800 of the example of FIG. 8 includes at least one programmable processor 805. The processor 805 executes coded instructions 810 and/or 812 present in main memory of the processor 805 (e.g., within a RAM 815 and/or a ROM 820). The processor 805 may be any type of processing unit, such as a processor core, a processor and/or a microcontroller. The processor 805 may execute, among other things, the example machine accessible instructions of FIGS. 6 and/or 7 to implement any or all of the example re-transmission controllers and/or any of all of the example noise predictors described herein. The processor 805 is in communication with the main memory (including a ROM 820 and/or the RAM 815) via a bus 825. The RAM 815 may be implemented by DRAM, SDRAM, and/or any other type of RAM device, and ROM may be implemented by flash memory and/or any other desired type of memory device. Access to the memory 815 and 820 may be controlled by a memory controller (not shown). The RAM 815 may be used to store and/or implement, for example, the example noise and/or error event information 325 of FIG. 3.

The processor platform 800 also includes an interface circuit 830. The interface circuit 830 may be implemented by any type of interface standard, such as a USB interface, a Bluetooth interface, an external memory interface, serial port, general purpose input/output, etc. One or more input devices 835 and one or more output devices 840 are connected to the interface circuit 830. The input devices 835 and/or output devices 840 may be used to implement an interface between a noise predictor and a re-transmission controller, between a receiver and a noise predictor and/or a re-transmission controller, and/or between a re-transmission controller and a transmitter.

Of course, persons of ordinary skill in the art will recognize that the order, size, and proportions of the memory illustrated in the example systems may vary. Additionally, although this patent discloses example systems including, among other components, software or firmware executed on hardware, it will be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, persons of ordinary skill in the art will readily appreciate that the above described examples are not the only way to implement such systems.

At least some of the above described example methods and/or apparatus are implemented by one or more software and/or firmware programs running on a computer processor. However, dedicated hardware implementations including, but not limited to, an ASIC, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are optionally stored on a tangible storage medium, such as: a magnetic medium (e.g., a disk or tape); a magneto-optical or optical medium such as a disk; or a solid state medium such as a memory card or other package that houses one or more read-only (non-volatile) memories, random access memories, or other re-writable (volatile) memories; or a signal containing computer instructions. A digital file attachment to e-mail or other self-contained information archive or set of archives is considered a distribution medium equivalent to a tangible storage medium. Accordingly, the example software and/or firmware described herein can be stored on a tangible storage medium or distribution medium such as those described above or equivalents and successor media.

To the extent the above specification describes example components and functions with reference to particular devices, standards and/or protocols, it is understood that the teachings of the invention are not limited to such devices, standards and/or protocols. Such systems are periodically superseded by faster or more efficient systems having the same general purpose. Accordingly, replacement devices, standards and/or protocols having the same general functions are equivalents which are intended to be included within the scope of the accompanying claims.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method comprising:
   detecting an error in received data;
   predicting a time interval that is expected to be substantially error-free; and
   transmitting a re-transmission request message for the data based on the time interval, wherein the re-transmission request message comprises a value representative of when the data is to be re-transmitted.

2. A method as defined in claim 1, further comprising transmitting the re-transmission request message during the time interval.

3. A method as defined in claim 2, further comprising receiving a re-transmission of the data during a second predicted error-free time interval.

4. A method as defined in claim 3, wherein the second time interval is different than the time interval.

5. A method as defined in claim 2, wherein the re-transmission request message is transmitted at substantially a beginning of the time interval.

6. A method as defined in claim 1, wherein the value represents a beginning of a second predicted error-free time interval.

7. A method as defined in claim 6, wherein the second time interval is different than the time interval.

8. A method as defined in claim 1, wherein the time interval is predicted based on the error and one or more previous errors that occurred prior to the first error.

9. A method as defined in claim 8, wherein predicting the time interval based on the error and the one or more previous errors comprises:
   analyzing the error and the one or more previously detected errors to predict a second time when a second error is likely to occur; and
   selecting the time interval to not include the second time, wherein receiving a re-transmission of the data is to occur during the time interval.

10. A method as defined in claim 9, wherein predicting the time interval based on the error and the one or more previous errors further comprises:
    analyzing the error and the one or more previous errors to predict an error duration; and
    selecting the time interval to not include a second time interval defined by the second time and the predicted error duration.

11. A method as defined in claim 1, wherein the time interval is predicted to reduce a likelihood of a second error affecting a re-transmission of the data.

12. A method as defined in claim 1, wherein the time interval is predicted to reduce a likelihood of a second error affecting the transmission of the re-transmission request message.

13. A method as defined in claim 1, further comprising receiving a re-transmission of the data during the time interval.

14. A method as defined in claim 1, further comprising using the error and at least one other error to predict the time interval when a type of the error is a repeating noise type.

15. A tangible article of manufacture storing machine readable instructions which, when executed, cause a machine to at least:
    detect a first error in received data;
    predict a time interval that is expected to be substantially error-free; and
    transmit a re-transmission request message for the data based on the time interval, wherein the machine accessible instructions, when executed, cause the machine to predict the time interval based on the first error and one or more previous errors that occurred prior to the first error.

16. An article of manufacture as defined in claim 15, wherein the machine accessible instructions, when executed, cause the machine to transmit the re-transmission request message during the time interval.

17. An article of manufacture as defined in claim 16, wherein the machine accessible instructions, when executed, cause the machine to receive a re-transmission of the data during a second predicted error-free time interval.

18. An article of manufacture as defined in claim 15, wherein the re-transmission request message comprises a value representative of when the data is to be re-transmitted.

19. An article of manufacture as defined in claim 15, wherein the machine accessible instructions, when executed, cause the machine to predict the time interval based on the first error and the one or more previous errors by:
   analyzing the first error and the one or more previously detected errors to predict a second time when a second error is likely to occur; and
   selecting the time interval to not include the second time, wherein receiving a re-transmission of the data is to occur during the time interval.

20. An article of manufacture as defined in claim 15, wherein the machine accessible instructions, when executed, cause the machine to use the first error and at least one other error to predict the time interval when a type of the first error is a repeating noise type.

21. An apparatus comprising:
   a noise predictor to predict a time interval that is expected to be substantially error-free; and
   a re-transmission controller to send a re-transmission request message for received data based on the predicted time interval.

22. An apparatus as defined in claim 21, further comprising a receiver to receive the data and to detect an error in the received data.

23. An apparatus as defined in claim 21, further comprising a transmitter to transmit the re-transmission request message during the predicted time interval.

24. An apparatus as defined in claim 23, wherein the re-transmission request message is transmitted at substantially the start of the predicted time interval.

25. An apparatus as defined in claim 21, wherein the re-transmission request message comprises a value representative of when the data is to be re-transmitted.

26. An apparatus as defined in claim 21, wherein noise predictor is to predict the time interval based on an error detected in the received data and one or more previous errors that occurred prior to the first error.

27. An apparatus as defined in claim 26, wherein the noise predictor comprises:
   an arrival rate calculator to analyze the error and the one or more previously detected errors to predict a second time when a second error is likely to occur; and
   an event predictor to select the time interval to not include the second time.

28. An apparatus as defined in claim 27, wherein the noise predictor further comprises a duration calculator to analyze the error and the one or more previously detected errors to predict an error duration, wherein the event predictor is to select the time interval to not include a second time interval defined by the second time and the predicted error duration.

* * * * *